US011126657B2

(12) United States Patent
Zhang (10) Patent No.: US 11,126,657 B2
(45) Date of Patent: Sep. 21, 2021

(54) EFFICIENT IN-MEMORY REPRESENTATION OF COMPUTATION GRAPH FOR FAST SERIALIZATION AND COMPARISON

(71) Applicant: ALIBABA GROUP HOLDING LIMITED, Grand Cayman (KY)

(72) Inventor: Weifeng Zhang, San Mateo, CA (US)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 530 days.

(21) Appl. No.: 16/005,513

(22) Filed: Jun. 11, 2018

(65) Prior Publication Data
US 2019/0377831 A1 Dec. 12, 2019

(51) Int. Cl.
| | | |
|---|---|---|
| *G06F 17/16* | (2006.01) | |
| *G06F 16/901* | (2019.01) | |
| *G06F 3/06* | (2006.01) | |
| *G06N 20/00* | (2019.01) | |
| *G06F 12/02* | (2006.01) | |

(52) U.S. Cl.
CPC .......... *G06F 16/9024* (2019.01); *G06F 3/067* (2013.01); *G06F 3/0611* (2013.01); *G06F 3/0661* (2013.01); *G06F 17/16* (2013.01); *G06N 20/00* (2019.01); *G06F 12/0284* (2013.01)

(58) Field of Classification Search
CPC .............. G06F 12/0284; G06F 9/5016; G06F 16/9024; G06F 17/16
See application file for complete search history.

(56) References Cited

U.S. PATENT DOCUMENTS

| | | | | |
|---|---|---|---|---|
| 5,729,223 | A * | 3/1998 | Trissel | G06T 9/005 |
| | | | | 341/51 |
| 6,434,590 | B1 * | 8/2002 | Blelloch | G06F 9/5066 |
| | | | | 718/102 |
| 7,533,236 | B1 * | 5/2009 | Nordquist | G06F 9/5016 |
| | | | | 711/100 |
| 9,594,854 | B1 * | 3/2017 | Orofino | G06F 30/00 |
| 9,836,381 | B2 * | 12/2017 | Wang | G06F 11/3604 |
| 2001/0010071 | A1 * | 7/2001 | Vlot | G06F 9/30134 |
| | | | | 712/11 |
| 2004/0073529 | A1 * | 4/2004 | Stanfill | G06F 9/4494 |
| | | | | 706/45 |
| 2005/0223156 | A1 * | 10/2005 | Lubbers | G06F 3/0619 |
| | | | | 711/100 |
| 2006/0143365 | A1 * | 6/2006 | Kikuchi | G06F 3/0679 |
| | | | | 711/103 |
| 2006/0253498 | A1 * | 11/2006 | Barrs | G06F 12/0269 |

(Continued)

*Primary Examiner* — Kibrom K Gebresilassie
(74) *Attorney, Agent, or Firm* — Finnegan, Henderson, Farabow, Garrett & Dunner, LLP (57) ABSTRACT

Embodiments of the present disclosure introduce an offset-based representation for a computation graph of a neural network model. In this representation, the edges in the graph are implemented as offsets to the base address of the graph when the model is loaded into memory rather than pointers to address locations in memory. By replacing the pointer fields with offsets, the model in memory is no longer dependent on the allocation of memory. This overcomes the limitations of performance and/or power that is critical for comparing two models and copying a model to another memory location in latency sensitive applications and in mobile environments.

21 Claims, 7 Drawing Sheets

(56) References Cited

U.S. PATENT DOCUMENTS

| | | | | |
|---|---|---|---|---|
| 2009/0019221 A1* | 1/2009 | Kessler | ............... | G06F 12/0284 |
| | | | | 711/113 |
| 2011/0016153 A1* | 1/2011 | Atta | ..................... | G06F 16/282 |
| | | | | 707/797 |
| 2011/0167192 A1* | 7/2011 | Iyer | .................... | G06F 12/0851 |
| | | | | 711/5 |
| 2013/0263116 A1* | 10/2013 | Haupt | ................. | G06F 9/45504 |
| | | | | 718/1 |
| 2015/0156736 A1* | 6/2015 | Guo | ..................... | H04W 56/00 |
| | | | | 370/350 |
| 2017/0228164 A1* | 8/2017 | Jayasena | ............. | G06F 12/0802 |
| 2017/0255780 A1* | 9/2017 | Hughes | ................ | G06F 3/0631 |

* cited by examiner

EFFICIENT IN-MEMORY REPRESENTATION OF COMPUTATION GRAPH FOR FAST SERIALIZATION AND COMPARISON

BACKGROUND

In machine learning (ML) or deep learning (DL), a neural network may be graphically represented by a computation graph or a data structure comprising nodes and edges organized as a directed acyclic graph (DAG). Nodes represent variables or computation operations, while edges represent data or tensor flowing from one node to another. An incoming edge to a node representing a computation operation is input data consumed by the computation operation, while an outgoing edge from the node represents output data produced by the computation operation.

A typical ML/DL model may have thousands or even millions of nodes and is usually very large (hundreds of Mbytes). Scenarios exist that involve either comparing two models for equivalence or copying a model from one location to another. Due to their size, comparing two models for equivalency or copying a model from a memory location to another memory location on a different computing device becomes a time-consuming task because the entire graph of the one or more model must be traversed to obtain each node's in-memory location.

SUMMARY

Embodiments of the present disclosure provide a method performed by a computing device for providing a data structure associated with a computation graph. The method comprising allocating one or more memory blocks associated with the computation graph and assigning a plurality of memory units of the allocated one or more memory blocks, wherein each memory unit in the plurality of memory units is associated with a node of the computation graph. The plurality of memory units includes a first section that is assigned a value corresponding to a node in the plurality of nodes and a second section that is assigned an offset value associated with another node connected to the node via an edge. Further, the method wherein the second node is an operand and wherein the second node represents a function between the first node and a third node, wherein the first section of the second node is a result of the function. Further, the method wherein the value corresponding to the first node is a null or negative integer value until the function is executed. The method further comprising assigning to each of the plurality of nodes a same memory size, assigning a binary value of information to the first section of each node in the plurality of nodes, assigning to the second section of each node in the plurality of nodes, a binary value of the start of the first section of another node in the plurality of nodes connected to each node in the plurality of nodes via an edge, and repeatedly assigning the binary value of the start of the first section of each node connected to another node via an edge until a binary value is assigned in the respective second section of each node in the plurality of nodes.

Further, the method wherein the information is a variable or an operand. The method, where a root or base node of the computation graph has a null or negative integer value in the second section, the edge is unidirectional, and wherein the computation graph is nested within another computation graph and wherein the first section of a node in the plurality of nodes is assigned a zero-integer value if the edge between the node and another node in the plurality of nodes lies within a same computation graph.

Embodiments of the present disclosure also provide a computing device comprising one or more memory blocks associated with a computation graph, and a plurality of memory units wherein each memory unit of the plurality of memory units associated with a node of the computation graph and including a first section assigned a value corresponding to a node in a plurality of nodes, and a second section assigned an offset value corresponding to another node in the plurality of nodes connected to the node via an edge. The device, wherein the second node is an operand and wherein the second node represents a function between the first node and a third node, wherein the first section of the second node is assigned a value of the function. The device, wherein the value corresponding to the first node is a null or a negative integer value until the function is executed.

The device further comprising a same memory size assigned to each of the plurality of nodes, a binary value of information assigned to the first section of each node in the plurality of nodes, a binary value assigned to the second section of each node in the plurality of nodes, wherein the binary value is a start of the first section of another node in the plurality of nodes connected to each node in the plurality of nodes via the edge, and the binary value repeatedly assigned to the start of the first section of each node connected to another node via an edge until a binary value is assigned in the respective second section of each node in the plurality of nodes. The device, wherein the information is a variable or an operand, wherein a root or a base node has a null or negative integer value in the second section, the edge is unidirectional, and wherein the computation graph is nested within another computation graph and wherein the first section of a node in the plurality of nodes is assigned a zero-integer value if the edge between the node and another node in the plurality of nodes lies within a same computation graph.

Embodiments of the present disclosure also provide a tangible non-transitory computer readable medium that stores a set of instructions that is executable by a processor device to cause the processor device to perform the aforementioned method for providing a data structure associated with a computation graph.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

As stated above, it may be desirable to quickly compare two models for equivalence or to quickly copy the model from one location to another. For example, in a first scenario, it may be desirable to deploy a preferred configuration of computation graphs of the models for executing the model on a particular computation hardware such as a particular central processing unit (CPU), a graphics processing unit (GPU), a Field-Programmable Gate Array (FPGA), or other type of accelerator hardware. The preferred computation graph configuration may be auto tuned or searched offline and may be stored in a database for future reference.

In a second scenario, when a computation graph (or its subgraph) of a program is compiled and optimized into an underlying computation hardware executable format just before the program is executed (just-in-time or JIT compilation), the program is often compared against its offline compilation (ahead-of-time or AOT compilation). To reduce overhead of the JIT compilation and optimization, the optimized graph is stored in a code cache so that the model can be looked up and retrieved without recompilation.

In a third scenario, when exporting or saving a DL/ML model from one memory location to another memory location on a different computing device, the computation graph of the model is serialized/e deserialized from its in-memory location to an external storage, or vice-versa. This process may involve patching each node to fold the node into an allocation-independent format before copying the nodes out.

In the first two scenarios discussed above, it is often required to quickly identify if a model is identical to a known model for a key-based lookup (e.g., in a code cache or a configuration database) without traversing the entire graph. In the last scenario, exporting or saving a model may require a fast conversion between two different storage formats and a quick transfer of the model. Quick lookups and fast memory transfer may be critical for performance and/or power, especially for latency sensitive applications and in mobile environments.

Figure 1:
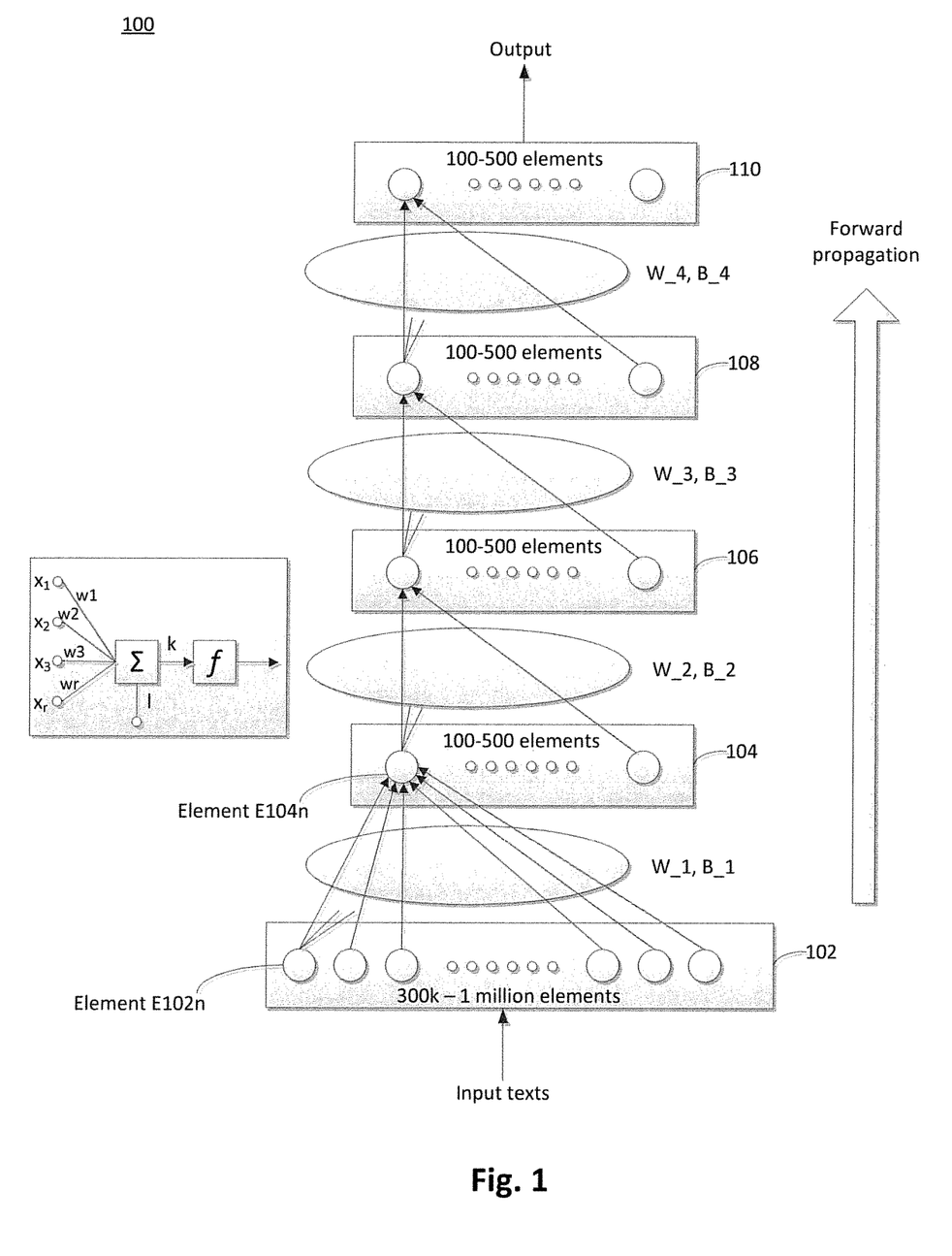
FIG. 1 illustrates an exemplary machine learning model, consistent with embodiments of the present disclosure.

To readily appreciate just how large a typical ML/DL model can get, with usually thousands or even millions of nodes and usually hundreds of Mbytes of data, a look at generating such a ML/DL model is prudent. Reference is now made to FIG. 1, which illustrates an exemplary machine learning model 100. Machine learning model 100 can be configured to map a set of text or numeric data into a vector space to perform certain types of analysis. Machine learning model 100 can be used in, for example, image recognition, a search query auto-completion system, a search engine, etc.

As shown in FIG. 1, machine learning model 100 can include a deep neural network topology with multiple layers, including layers 102, 104, 106, 108, and 110. Each layer includes a predetermined number of storage elements. In a case where machine learning model 100 is used to map numeric data into a vector space, each storage element can correspond to a vector value associated with a set of reference numeric values. For example, layer 102 includes 300 k-1 million storage elements, which can correspond to a set of reference numeric values numbered between 300 thousand to 1 million. Also, each of layers 104, 106, 108, and 110 includes 100-500 storage elements, which can correspond to a set of 100-500 reference numeric values.

Each storage element of a layer may store an output value determined based on a set of weights w, bias value b, and a set of input values. As to be discussed below, each storage element can also store an error value. For layer 102, the set of input values can be a set of numbers representing a collection of input texts (e.g., a formula). For each of layers 104, 106, 108, and 110, the set of input values can be some or all of the output values stored in a preceding layer (e.g., $x_1, x_2, x_3, x_r$). For example, as shown in FIG. 1, the output value stored in storage element E104n of layer 104 can be determined based on the output values stored in each storage element of layer 102, a weighing matrix W_1, and a bias matrix B_1, according to the following exemplary equation:

$$E104n = f(\Sigma_{i=1}^{N})(wi \times E102i) + bn) \quad \text{(Equation 1)}$$

Here, wi can be a matrix value included in weighing matrix W_1 that corresponds to a particular storage element E102i of layer 102 out of N storage elements in layer 102. Moreover, bn can be a matrix value included in bias matrix B_1 that corresponds to storage element E104n.

The output values stored in each of layers 102, 104, 106, 108, and 110 can be determined based on Equation 1 above, in a forward propagation process. For example, after the output values stored in the storage elements of layer 102 are generated, these output values can be propagated to layer 104 where these values are combined with weighing matrix W_1 and bias matrix B_1 according to Equation 1 to generate the values stored in layer 104. Subsequently, the output values of layer 104 can be propagated to layer 106 to be combined with weighing matrix W_2 and bias matrix B_2 to generate the output values stored at layer 106 and so on until layer 110. The set of vectors can then be used to determine an attribute of the input numeric values. As an illustrative example, the set of vectors can be used to determine a semantic relationship between the input numeric values and a set of numeric values in a document, which can then be provided as a search result in response to a query containing the input numeric value. The semantic relationship can be determined based on, for example, a cosine distance between the set of vectors output by machine learning model 100 and a set of vectors representing the set of documents containing the numeric value.

A simplified version of Equation 1 can be expressed as:

$$(a*b)+c \quad \text{(Equation 2).}$$

With reference to Equation 1, variable "c" is, for example, a constant value (e.g., bias value bn of Equation 1), while variables "a" and "b" are, for example, variable values (e.g., weight value wi and input value from E102i of Equation 1).

Figure 2:
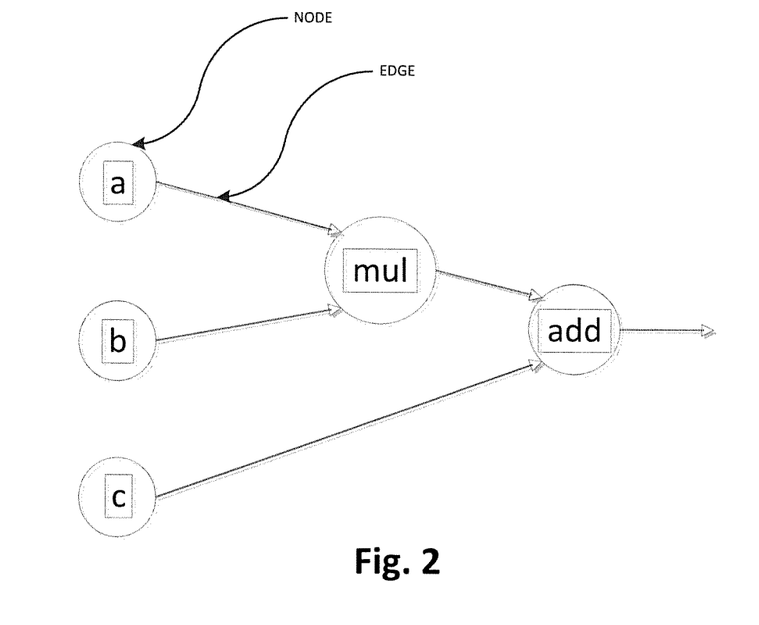
FIG. 2 illustrates an exemplary computation graph representation.

FIG. 2 illustrates an exemplary simplified computation graph representation of Equation 2. Operands "a," "b," and "c" and operations mul ("*") and add ("+") are illustrated as nodes, while the edges are unidirectional pointers from a node to a next node. In an exemplary C++ implementation, traversing a conventional computation graph representation of the algorithm can involve a Node class having a utility function to retrieve its next node, coded as:

```
Class Node {
Private:
Operation op;
Data data;
    .
    .
    .
Node* next;
Public:
Node*getNextNode ( )
{
Return next;
}
}
```

Figure 3:
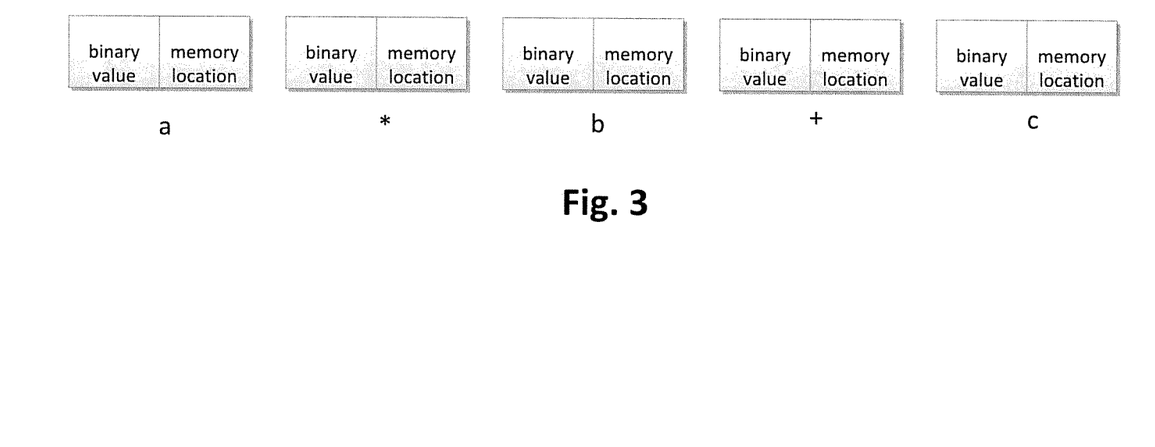
FIG. 3 illustrates an exemplary data structure representation of the computation graph of FIG. 2.

FIG. 3 illustrates an exemplary conventional 8-byte representation of each operand and operation of the algorithm discussed in FIG. 2, where the first 4-bytes represent the binary value of the operand or operation and the last 4-bytes represent a pointer location.

A graph must be traversed, as noted to compare two models for equivalence or to copy a model from a memory location on a computing device to a memory location such as an external memory on a different computing device. In operation, when a model is loaded into memory for execution (e.g., for comparing the model to another model or copying the model to an external memory), the model's in-memory representation is implemented such that each node in the model is a flat data structure with edges to/from the nodes as pointers. Since the pointers are allocation dependent, each node must be visited such that the entire graph is traversed to compile the model into an executable format. Comparing two models for equivalency requires a similar graph traversal, where a node in each model is compared with each other before moving to the comparison of the next pair of nodes by following the edge or pointer. Depending on where each node that is being compared is allocated within the memory, the pointer address inside each node is different. Similarly, during graph traversal for serializing a model, each node is patched to "fold" the node into an allocation-independent format before the node is copied to an external memory location. Patching of the nodes is required as the pointer address inside each node becomes invalid once the model is serialized. In-memory representation that depends on the location of each node within the memory is performance and/or power critical for comparing two models and copying a model to another memory location, especially in a direct memory access transfer and a block memory transfer, in latency sensitive applications and in mobile environments.

Figure 4A:
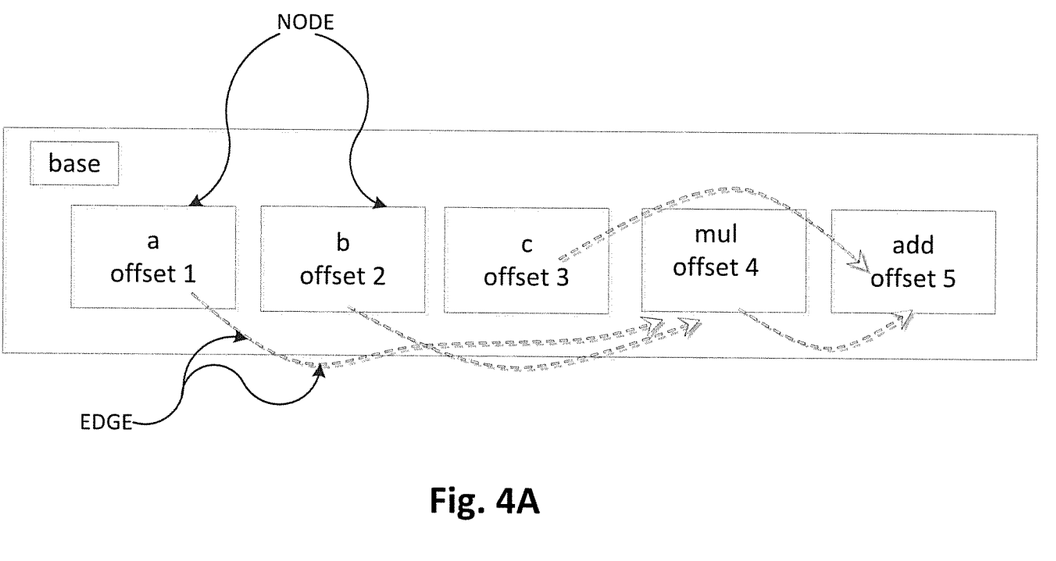
FIG. 4A illustrates an exemplary computation graph representation using offsets, consistent with embodiments of the present disclosure.

The embodiments of the present disclosure introduce an offset-based representation for a computation graph of a neural network model. In this representation, the edges in the graph are implemented as offsets to the base address of the graph when the model is loaded into memory rather than as pointers to address locations in memory. FIG. 4A illustrates an exemplary computation graph representation of an algorithm in a neural network showing offsets, consistent with embodiments of the present disclosure. The figure illustrates a representation of Equation 2 (i.e., (a*b)+c). Operands "a," "b," and "c" and operations mul ("*") and add ("+") are illustrated as nodes, while the edges are unidirectional offsets of a node from its base node. In operation, while traversing the graph, the address of each node is determined as the edge corresponding to an offset with respect to the address of the base node.

For example, in a representational C++ implementation to traverse a computation graph representation of the algorithm in accordance with the present disclosure, the utility function to retrieve its next node in the Node class is now coded as:

```
Class Node {
Private:
Operation op;
Data data;
    .
    .
    .
Int offset;
Node* next;
Public:
Node*getNextNode ( )
{
Return reinterpret_cast <Node*> (base + offset);
}
}
```

By replacing the pointer fields (absolute address or memory location) with offsets (relative address to a base), the neural network model in memory is no longer dependent on the allocation of memory. That is, the model can be placed anywhere in memory. This concept of offset-based representation for a computation graph of a neural network model overcomes the limitations of conventional representation of the computation graph that are performance and/or power critical for comparing two models and copying a model to another memory location in latency sensitive applications and in mobile environments. Also, unlike conventional representation of the computation graph, the offset-based representation does not introduce unamortized overhead costs or time restraints when traversing the graph.

Further, when a neural network model is serialized using the offset-based representation to an external storage, the model can be copied as a single block via any "fast" copy mechanism, for example direct access memory (DMA), without format conversion or patching. Subsequently, when the model is deserialized from the external storage back to memory, the model can be copied as a single block via any "fast" copy mechanism such as DMA without a need to repair the edges as in conventional methods. Also, when comparing the neural network model with another network model, the memory block of the network model using the offset-based representation can be compared directly (e.g. via fast memcmp implementation) with the memory block of the other network model, rather than traversing the graphs of each network model one node at a time as in conventional methods. Furthermore, the offset-based representation can enable generation of a lookup fast key to configure a database or for code caching. As the network model is memory-allocation independent, the entire network model may also be used to generate a digital signature, such as SHA1 secure hash.

Figure 4B:
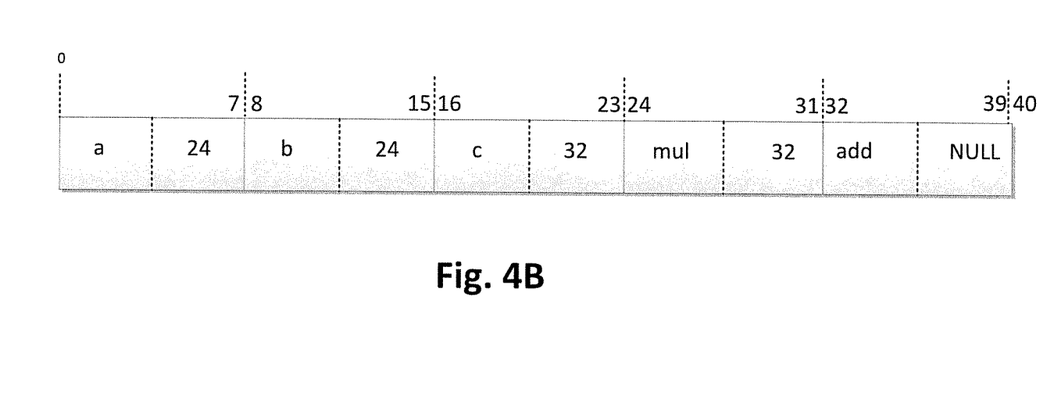
FIG. 4B illustrates an exemplary memory block data structure associated with the computation graph of FIG. 4A, consistent with embodiments of the present disclosure.

FIG. 4B illustrates an exemplary memory block data structure having memory units associated with each operand and operation of the computation graph representation of FIG. 4A. In operation, each memory unit may have a pre-set value, such as a zero, or a negative integer before the binary value of the operand, a result of the operation, or an offset replaces the pre-set value. In some embodiments, the memory units can be 8 bytes, where the first 4-bytes provide the binary value of the operand or operation and the last 4-bytes provide an offset representing an edge to the next node. As noted, the 8-byte representation is exemplary and that other size representations are wholly within the scope of the present disclosure. Accordingly, the memory unit for operand "a" occupies bytes 0-7, the memory unit for operand "b" occupies bytes 8-15, the memory unit for operand "c" occupies bytes 16-23, the memory unit for operation mul ("*") occupies bytes 24-31, and the memory unit for operation add ("+") occupies bytes 32-39. Thus, for the algorithm (a*b)+c, the memory unit associated with operand "a" has the binary value of variable "a" in the first 4-bytes and the binary value of its offset representing the edge to the next node (in this case, i.e., a binary value of 24 in the last 4-bytes as the offset of "a" is mul ("*"), which starts at byte 24). For simplicity, FIG. 4B illustrates the operand/operation or offset instead of the binary value of the operand/operation or offset. For example, rather than showing the binary values of operand "a" and offset "24," FIG. 4B shows operand "a" in the first 4-bytes and offset "24" in the next 4-bytes representing the position of mul ("*"). Similarly, the memory unit associated with operand "b" has the binary value of variable "b" in the first 4-bytes and the binary value of its offset (i.e., offset 24) in the last 4-bytes representing the position of mul ("*"); variable "c" has the binary value of "c" in the first 4-bytes and the binary value of its offset (i.e., offset 32) in the last 4-bytes representing the position of add ("+"). The memory unit for operand mul ("*") can have a binary value of the result of the operation of (a b) in the first 4-bytes and the binary value of its offset (i.e., 32) in the last 4-bytes representing the position of add ("+"); and the memory unit associated operand add ("+") can have the binary value of the result of the equation ((a*b)+c) in the first 4-bytes and the binary value of its offset (i.e., NULL) in the last 4-bytes. Since the memory unit associated with "add" corresponds to the base or root node in the computation graph of the algorithm, offset of "add" can be either NULL or a negative integer, such as −1. Moreover, it is appreciated that the binary value associated with the "mul" and "add" operations may be 0 or some other value before the operations occur.

Embodiments of the present disclosure may be applied to data structures that include pointers as structure members. For example, when comparing source programs, direct text comparison is often sensitive to white spaces or end of line (EOL) in the source programs. Accuracy of the comparison can be improved by comparing the corresponding abstract syntax tree (AST) of the source programs. By using the offset-based representation of the AST, the AST of the source programs in memory can be quickly compared because there are no memory allocation dependent pointers in the offset-based representation. It may also be possible to generate a hash key based on the AST's offset-based representation or enable a fast lookup for the corresponding compiled program from the code cache.

Figure 5A:
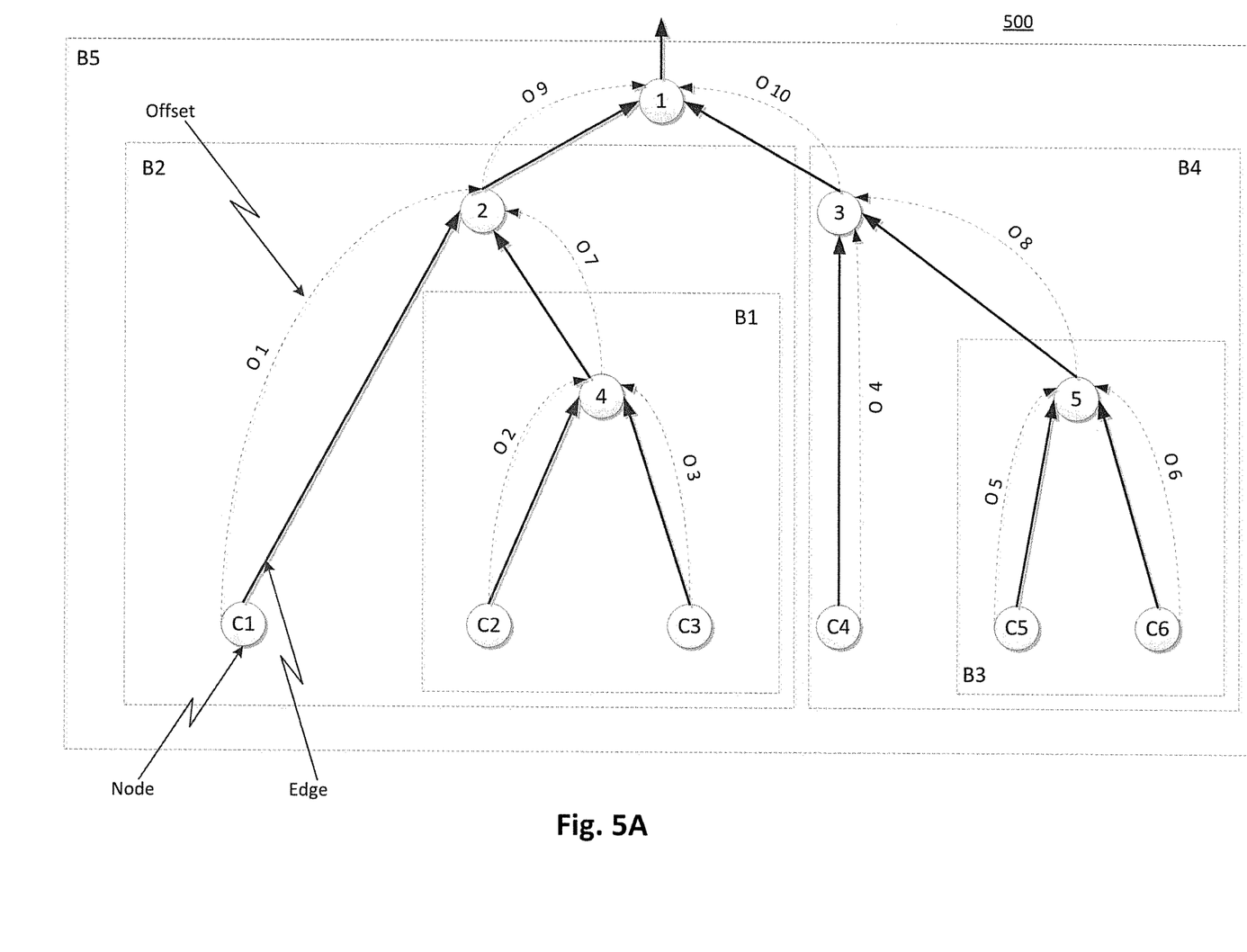
FIG. 5A illustrates an exemplary nested computation graph representation using offsets, consistent with embodiments of the present disclosure.

It should be noted that the embodiments of the present disclosure provide a single continuous memory allocation to store the entire computation graph as a single memory block. If this continuous allocation cannot be achieved because a continuous block of memory is not available, it is possible to partition the graph into multiple sub-graphs corresponding to smaller memory blocks (sub-blocks). FIG. 5A illustrates an exemplary computation graph representation in a neural network, consistent with embodiments of the present disclosure. Exemplary graph 500, when loaded into memory for execution, may be divided into memory sub-blocks B1-B5 for each of the five sub-graphs, respectively, where nodes C1-C6 are "child" nodes, nodes 2-5 are "parent" nodes and node 1 is a "root" node. The nodes may contain an operand or an operation. Sub-block B1 denotes the memory boundary space of sub-graph comprising nodes 4, C2, and C3. Similarly, sub-block B2 comprises nodes 2 and C1, and B1; sub-block B3 comprises nodes 5, C5, and C6; sub-block B4 comprises nodes 3 and C4, and B3; and sub-block B5 comprises node 1, and B2 and B4. For purposes of simplicity, it is appreciated that nodes C1-C6 are operand nodes, while nodes 1-5 are operation nodes.

Regarding the offsets, node C1's offset (O1) is directed to node 2, node C2's offset (O2) is directed to node 4, node C3's offset (O3) is directed to node 4, node C4's offset (O4) is directed to node 3, node C5's offset (O5) is directed to node 5, node C6's offset (O6) is directed to node 5, node 4's offset (O7) is directed to node 2, node 5's offset (O8) is directed to node 3, node 2's offset (O9) is directed to node 1, and node 3's offset (O10) is directed to node 1. It is appreciated that while FIG. 5A refers to multiple different offsets, it is appreciated that some of the offsets can be the same (e.g., offset O1 and offset O7 both have the same value representing the position of node 2).

Figure 5B:
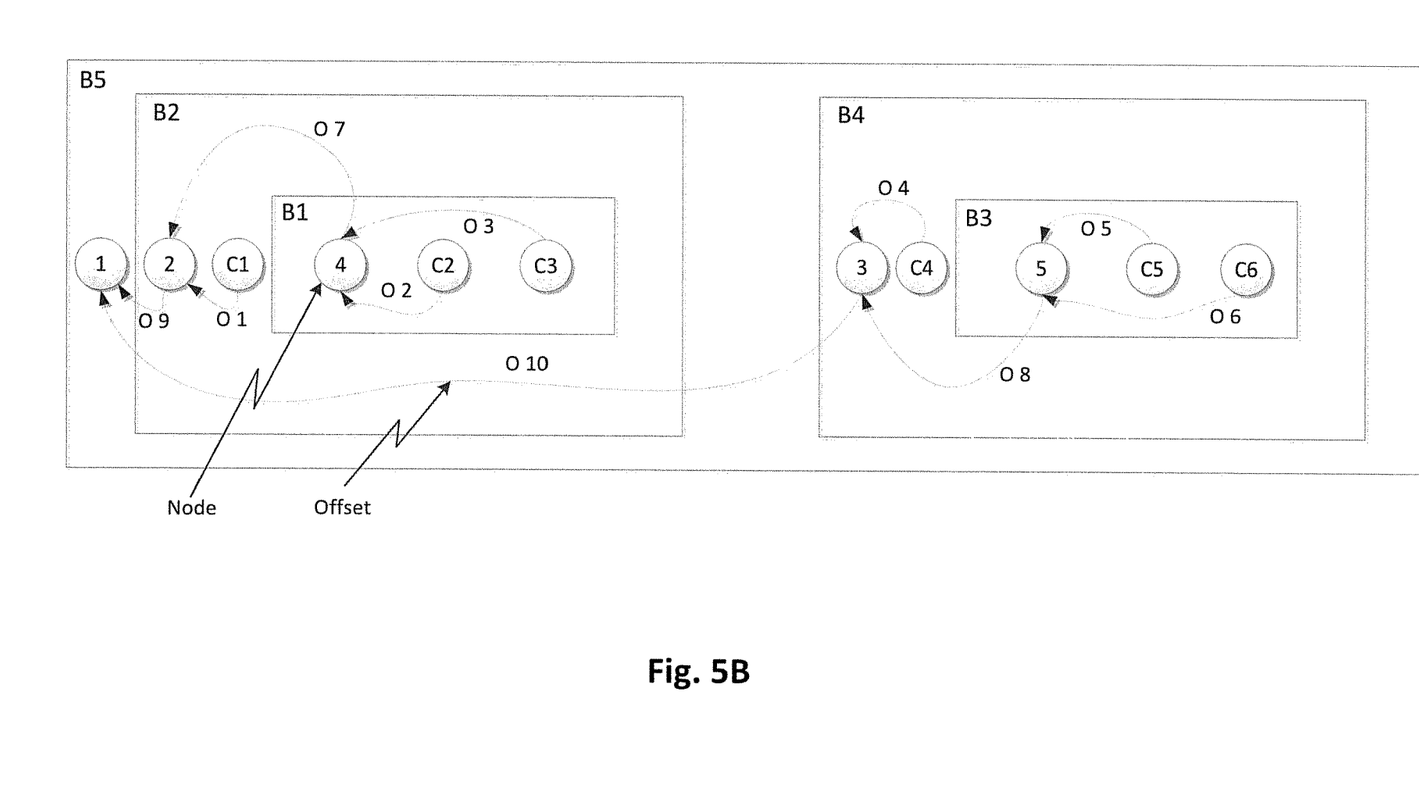
FIG. 5B illustrates an exemplary alternate computation graph representation FIG. 5A using offsets, consistent with embodiments of the present disclosure.

FIG. 5B illustrates an exemplary alternate computation graph representation of the nested computation graph discussed in FIG. 5A showing offsets, consistent with embodiments of the present disclosure. Operation nodes 1-5 and operand nodes C1-C6 are illustrated as nodes, while the edges are unidirectional offsets of the next node from its base or root node. In operation, while traversing a sub-graph, address of each node can be determined as the edge corresponds to <partitionNum, offsetWithinPartition>, while the next node corresponds to (base address+<partitionNum, offsetWithinPartition>). The value partitionNum is zero if an edge is between two nodes within a same sub-graph. For example, partitionNum=0 for the edge from node C1 to node 2 in FIG. 5B.

Figure 5C:
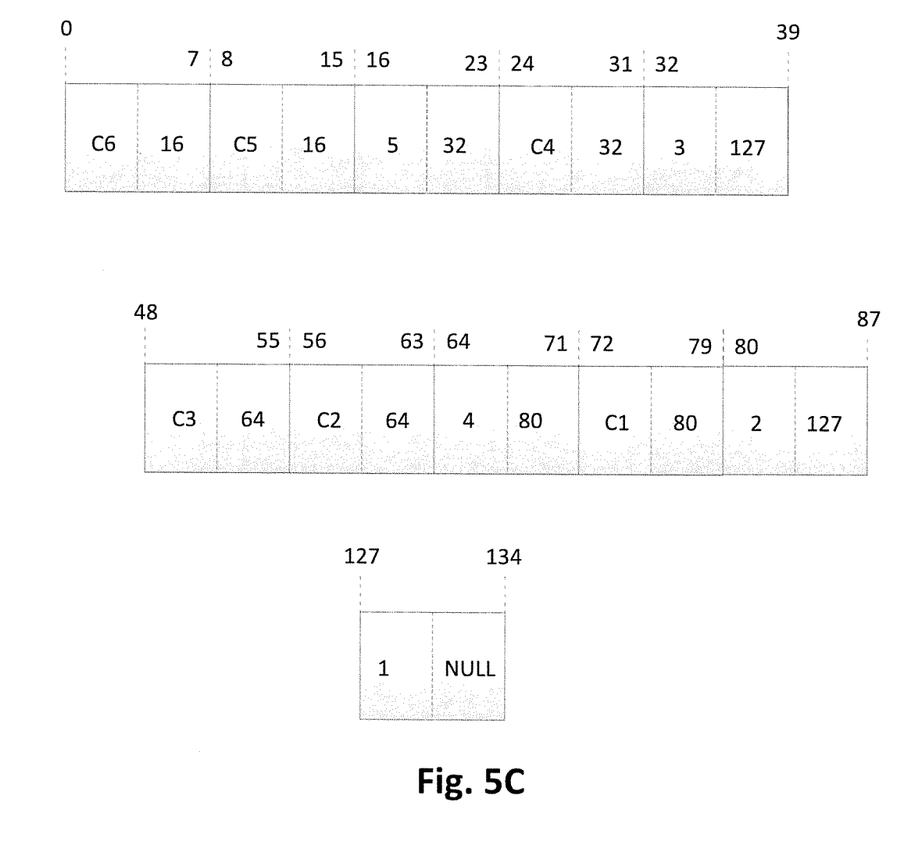
FIG. 5C illustrates another data structure representation of the computation graph of FIGS. 5A and 5B, consistent with embodiments of the present disclosure.

FIG. 5C illustrates exemplary sub-block data structures having memory units associated with each operand and operation of the computation graph of FIGS. 5A and 5B. It should be noted that in operation, each sub-block, for example sub blocks B1-B5 of FIGS. 5A and 5B may be non-contiguous. For simplicity sake, even though sub-block B1-B5 comprising nodes 1-6 and C1-C6 illustrated in FIGS. 5A and 5B, may not occupy contiguous memory spaces, the exemplary data structure illustrated at FIG. 5C shows sub-block B1 contiguous with sub-block B2 and sub-block B3 contiguous with sub-block B4, while sub-block B5 is non-contiguous with sub-blocks B2 and B4, respectively. Similarly, sub-blocks B2 and B4 are non-contiguous from each other. For example, node 5 comprised in sub-block B3 and node C4 comprised in sub-block B4 illustrated at FIGS. 5A and 5B may occupy non-contiguous memory space with node 3 comprised in memory sub-block B4 illustrated at FIGS. 5A and 5B. But for simplicity sake, FIG. 5C illustrates the memory units for both nodes 5 and C4 that offset to node 3 occupy contiguous memory units (node 5 occupies bytes 16-23, node C4 occupies bytes 24-31, and node 3 occupies bytes 32-39). It should also be noted that the byte locations illustrated in FIG. 5C are exemplary. For example, FIG. 5C shows that node C6 occupies memory unit of bytes 0-7, but node C6 could occupy any 8-byte location within the memory boundary space B3. Further, in this exemplary data structure, the first 4-bytes of memory unit represent the binary value of the operand or operation and the last 4-bytes represent its offset to the next node with respect to the base or root node. Accordingly, the memory unit associated with operand node C6 occupies bytes 0-7, the memory unit associated with operand node C5 occupies bytes 8-15, the memory unit associated with operation node 5 occupies bytes 16-23, the memory unit associated with operand node C4 occupies bytes 24-31, the memory unit associated with operation node 3 occupies bytes 32-39, the memory unit associated with operand node C3 occupies bytes 48-55, the memory unit associated with operand node C2 occupies bytes 56-63, the memory unit associated with operation node 4 occupies bytes 64-71, the memory unit associated with operand node C1 occupies bytes 72-79, operation node 2 occupies bytes 80-87, and the memory unit associated with operation node 1 occupies bytes 127-134. Thus, for the sub-graph, for example, the memory unit associated with node C6 has the binary value of its data in the first 4-bytes and the binary value of its offset (i.e., 16) in the last 4-bytes as the offset of node C6 is node 5, which starts at byte 16. For simplicity, FIG. 5C illustrates the nodes and the offsets instead of the binary value of the data in each node and the binary value of the offsets. For example, rather than showing the binary values of the data in node C6 and the binary value of its offset 16, FIG. 5C shows C6 in the first 4-bytes and offset 16 in the next 4-bytes. Similarly, the memory unit associated with node C5 has the binary value of its data in the first 4-bytes and the binary value of its offset (i.e., offset 16) in the last 4-bytes; the memory unit associated with node 5 has the binary value of its data in the first 4-bytes and the binary value of its offset (i.e., offset 32) in the last 4-bytes; the memory unit associated with node C4 has the binary value of its data in the first 4-bytes and the binary value of its offset (i.e., 32) in the last 4-bytes; and the memory unit associated with node 3 has the binary value of its data in the first 4-bytes and the binary value of its offset (i.e., 127) in the last 4-bytes.

A second sub-block can include the second group of nodes. For, the memory unit associated with node C3 has the binary value of its data in the first 4-bytes and the binary value of its offset (i.e., offset 64) in the last 4-bytes; the memory unit associated with node C2 has the binary value of its data in the first 4-bytes and the binary value of its offset (i.e., offset 64) in the last 4-bytes; the memory unit associated with node 4 has the binary value of its data in the first 4-bytes and the binary value of its offset (i.e., offset 80) in the last 4-bytes; and the memory unit associated with node C1 has the binary value of its data in the first 4-bytes and the binary value of its offset (i.e., offset 80) in the last 4-bytes; the memory unit associated with node 2 has the binary value of its data in the first 4-bytes and the binary value of its offset (i.e., offset 127, directed to third sub-block) in the last 4-bytes. In the third sub-block, the memory unit associated with node 1 has the binary value of its data in the first 4-bytes and the binary value of its offset (i.e., NULL) in the last 4-bytes. Since node 1 is the root or base node, node 1's offset can be either NULL or a negative integer, such as −1.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage media may be utilized in implementing a computer-implemented method. The term "computer-readable storage medium" should be understood to include tangible items and exclude carrier waves and transient signals.

Figure 6:
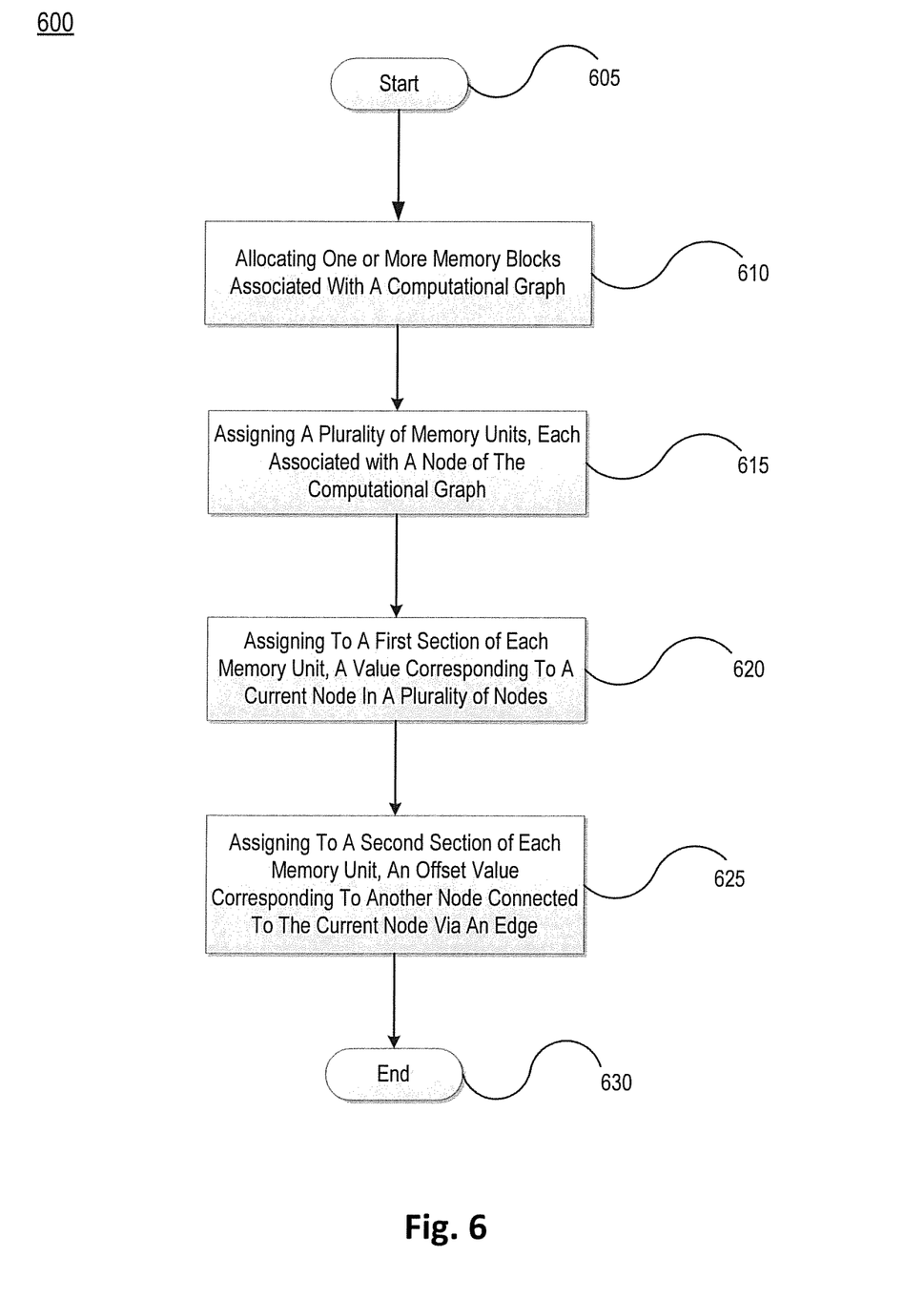
FIG. 6 illustrates an exemplary method for providing a data structure associated with a computation graph, consistent with embodiments of the present disclosure.

FIG. 6 illustrates an exemplary method 600 performed by a computing device for providing a data structure associated with a computation graph, consistent with embodiments of the present disclosure. The data structure can include a contiguous memory block (e.g., as shown in FIG. 4B) or multiple non-contiguous memory blocks (e.g., as shown in FIG. 5C).

After initial start step 605, at step 610, the computing device allocates one or more memory blocks associated with the computation graph. As stated above, the one or more memory blocks could be a contiguous memory block or multiple non-contiguous memory blocks.

Next, at step 615, the computing device assigns a plurality of memory units of the allocated one or more memory blocks, wherein each memory unit in the plurality of memory units is associated with a current node of the computation graph. In some embodiments, the initial address of the current node at creation may be a pre-set value, for example zero or a negative integer. For example, the node containing operand "a" in FIG. 2 may be initialized with a set of zeros or a negative integer depending on the bit size of the memory block.

Next, in order to assign values to a first and second sections of each memory unit, at step 620, the computing device assigns to the first section a value corresponding to a current node in the plurality of nodes. For example, the binary value of "a" is assigned to the first section of a memory unit (e.g., first section occupying bytes 0 to 7 at FIG. 4B). Next, at step 625, the computing device assigns to the second section an offset value corresponding to another node connected to the current node in the plurality of nodes via an edge. For example, the binary value of "mul", which is the offset binary value of 24, is assigned to the second section of the memory block occupying bytes 0 to 7 at FIG. 4B. Finally, at step 630 the method ends.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. It is intended, therefore, that the specification and examples be considered as illustrative only, with a true scope and spirit being indicated by the following claims and their full scope of equivalents.

The invention claimed is:

1. A method performed by a computing device for providing a data structure associated with a computation graph having a plurality of nodes, the method comprising:
    allocating one or more memory blocks associated with the computation graph; and
    assigning a plurality of memory units of the allocated one or more memory blocks, wherein each memory unit of the plurality of memory units is associated with a node of the computation graph and includes:
        a first section assigned a value corresponding to a current node of the plurality of nodes, and
        a second section assigned an offset value referencing another memory unit of the plurality of memory units, wherein the another memory unit is associated with another node coupled to the current node via an edge.

2. The method of claim 1, further comprising assigning the value corresponding to an operand value of the current node.

3. The method of claim 2, wherein the another node is an operation node that performs an operation using the operand value.

4. The method of claim 3, wherein the another memory unit includes a first section configured to have either a pre-set value or a value associated with an output of the operation using the operand value.

5. The method of claim 1, further comprising assigning the offset value based on a base address of a memory block of the allocated one or more memory blocks.

6. The method of claim 1, further comprising assigning the offset value based on a base address of a memory sub-block of the allocated one or more memory blocks.

7. The method of claim 1, wherein each memory unit of the plurality of memory units has a same size.

8. The method of claim 1, further comprising assigning a root memory unit corresponding to a root node of the computation graph, wherein the root memory unit includes:
    a first section assigned a value;
    a second section assigned a NULL or negative value.

9. The method of claim 1, further comprising generating a fast key lookup for configuring the data structure.

10. The method of claim 9, wherein the fast key lookup is a digital signature.

11. A computing device for providing a data structure associated with a computation graph having a plurality of nodes, the computing device comprising:
    a memory configured to store a set of instructions; and
    a processor configured to execute the set of instructions to cause the computing device to:
        allocate one or more memory blocks associated with the computation graph; and
        assign a plurality of memory units of the allocated one or more memory blocks, wherein each memory unit of the plurality of memory units is associated with a node of the computation graph and includes:
            a first section assigned a value corresponding to a current node of the plurality of nodes, and
            a second section assigned an offset value referencing another memory unit of the plurality of memory units, wherein the another memory unit is associated with another node coupled to the current node via an edge.

12. The computing device of claim 11, wherein the processor is configured to execute the set of instructions to cause the computing device to further perform:
    assign the value corresponding to an operand value of the current node.

13. The computing device of claim 12, wherein the another node is an operation node that performs an operation using the operand value.

14. The computing device of claim 13, wherein the another memory unit includes a first section configured to have either a pre-set value or a value associated with an output of the operation using the operand value.

15. The computing device of claim 11, wherein the processor is configured to execute the set of instructions to cause the computing device to further perform:
    assign the offset value based on a base address of a memory block of the allocated one or more memory blocks.

16. The computing device of claim 11, wherein the processor is configured to execute the set of instructions to cause the computing device to further perform:
    assign the offset value based on a base address of a memory sub-block of the allocated one or more memory blocks.

17. The computing device of claim 11, wherein each memory unit of the plurality of memory units has a same size.

18. The computing device of claim 11, wherein the processor is configured to execute the set of instructions to cause the computing device to further perform:
    assign a root memory unit corresponding to a root node of the computation graph, wherein the root memory unit includes:
    a first section assigned a value;
    a second section assigned a NULL or negative value.

19. The computing device of claim 11, wherein the processor is configured to execute the set of instructions to cause the computing device to further perform:
    generate a fast key lookup for configuring the data structure.

20. The computing device of claim 19, wherein the fast key lookup is a digital signature.

21. A non-transitory computer readable medium that stores a set of instructions that is executable by at least one processor of a computing device to cause the computing device to perform a method for providing a data structure associated with a computation graph having a plurality of nodes, the method comprising:

allocating one or more memory blocks associated with the computation graph; and     assigning a plurality of memory units of the allocated one or more memory blocks, wherein each memory unit of the plurality of memory units is associated with a node of the computation graph and includes:

a first section assigned a value corresponding to a current node of the plurality of nodes, and         a second section assigned an offset value referencing another memory unit of the plurality of memory units, wherein the another memory unit is associated with another node coupled to the current node via an edge.

\* \* \* \* \*